Jan. 18, 1966   M. J. SMOTHERS   3,229,959
CASTER AND CAMBER CORRECTION TOOL ASSEMBLY
Filed July 3, 1963   3 Sheets-Sheet 1
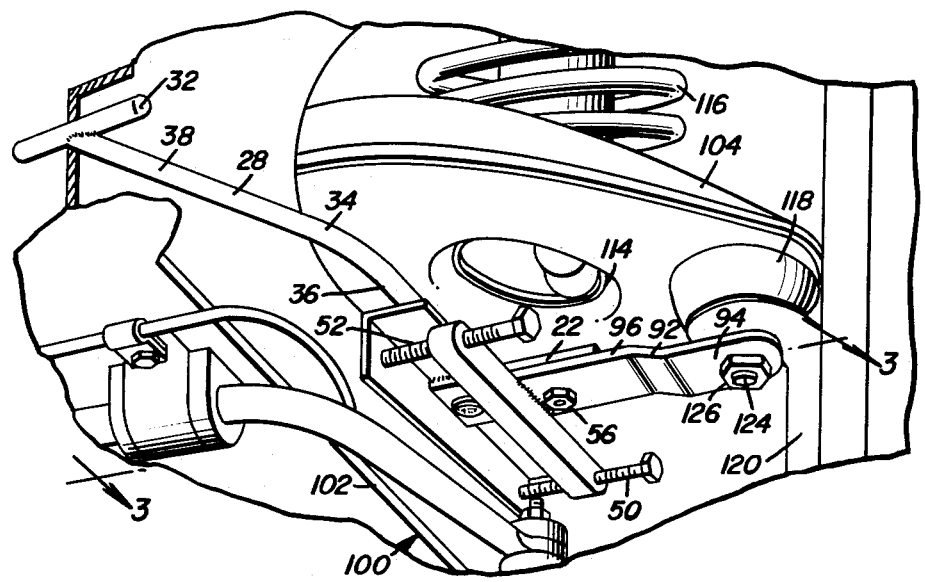
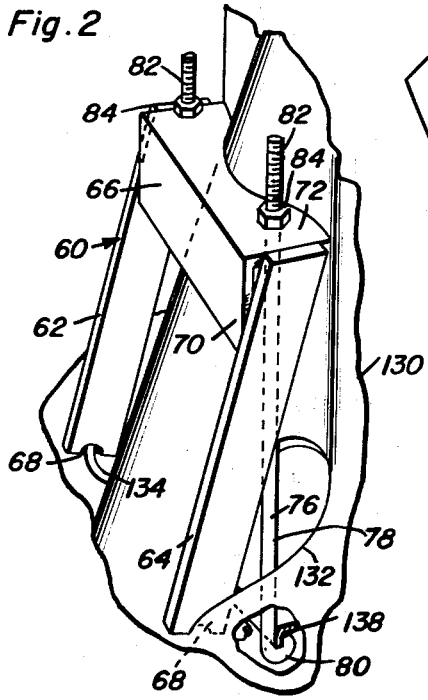
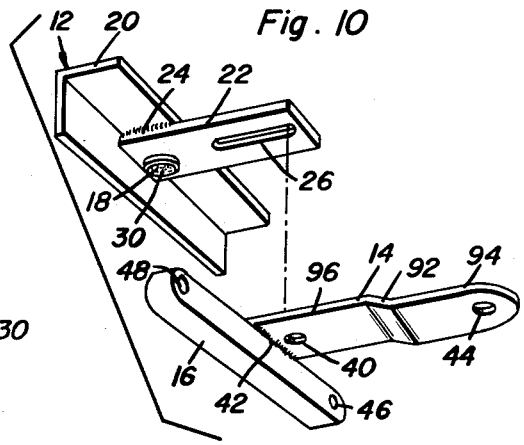
Melvin J. Smothers
INVENTOR.

Jan. 18, 1966 M. J. SMOTHERS 3,229,959
CASTER AND CAMBER CORRECTION TOOL ASSEMBLY
Filed July 3, 1963 3 Sheets-Sheet 2

Melvin J. Smothers
INVENTOR.
BY
Attorneys

Jan. 18, 1966    M. J. SMOTHERS    3,229,959
CASTER AND CAMBER CORRECTION TOOL ASSEMBLY
Filed July 3, 1963    3 Sheets-Sheet 3
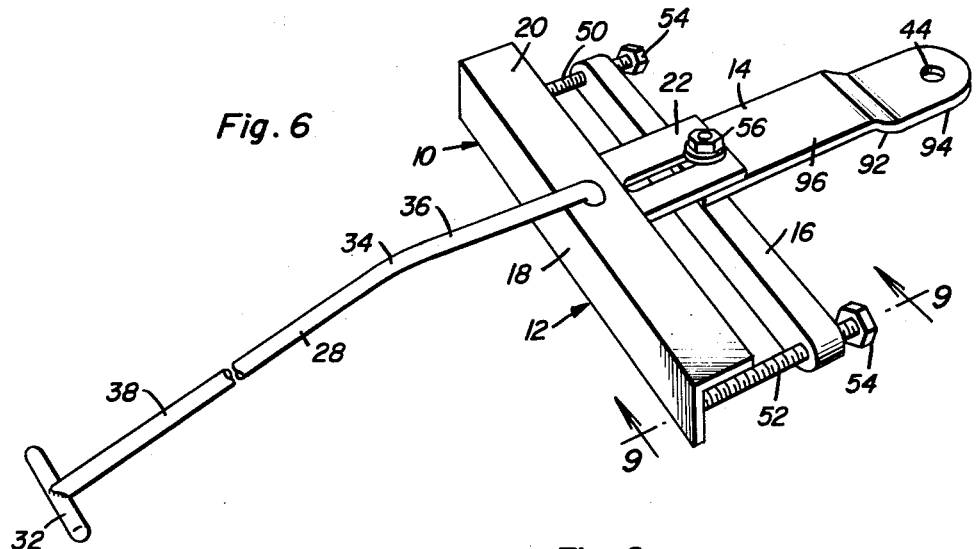
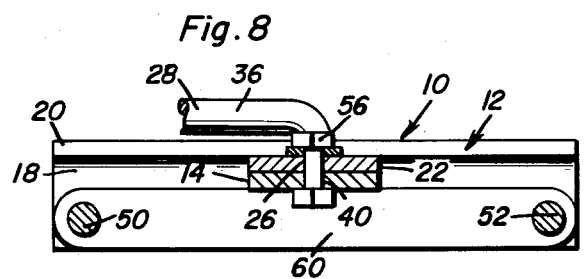
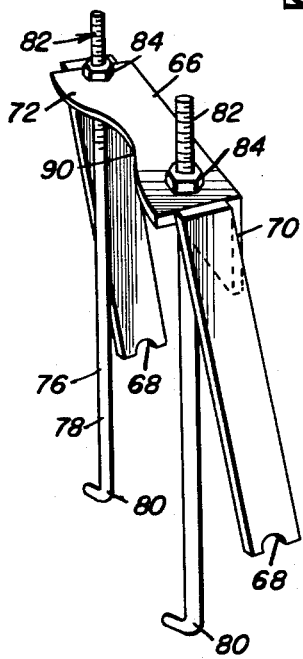
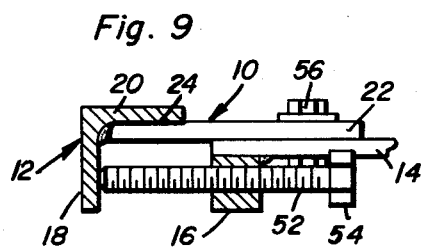
Melvin J. Smothers
INVENTOR.

United States Patent Office 3,229,959
Patented Jan. 18, 1966

3,229,959
CASTER AND CAMBER CORRECTION TOOL ASSEMBLY
Melvin J. Smothers, Amarillo, Tex., assignor to M.J.S., Inc., a corporation of New Mexico
Filed July 3, 1963, Ser. No. 292,556
13 Claims. (Cl. 254—100)

This invention relates to a novel and useful tool assembly and more specifically to a tool assembly which is designed primarily for adjusting the caster and camber of late model Ford Fairlane 500 and Mercury Meteor automobiles.

In the past, vehicles provided with independent front wheel suspension have included upper and lower control arms for each independent wheel and each pair of control arms extends transversely of the corresponding side of the vehicle and is pivotally secured to the vehicle at its inner end for rotation about a generally horizontally disposed axis extending generally longitudinally of the vehicle while the outer ends of each pair of corresponding arms are interconnected by means of the wheel spindle which rotatably journals the wheel. While the aforementioned structure is still considered conventional, in the past the inner ends of the upper control arms have been mounted by means of eccentrically mounted journals and some of the present day vehicles such as the late model Fairlane 500 and Mercury Meteor models have the inner ends of the upper control arms secured to the frame of the vehicle by means of bearing journals secured to the frame by means of bolts passing through suitable mounting portions of the journals and received and secured through elongated openings formed in the portion of the frame to which the journals are secured. Accordingly, while the latter construction is less expensive to manufacture and more suitable to manufacture by mass production methods, subsequent adjustment of the caster and camber by shifting the outer ends of the upper control arms as needed through a generally horizontally disposed plane and retaining that adjustment until such time as the holddown bolts for the journals which support the inner ends of the upper control arms may be tightened has been made more difficult. In fact, the task of adjusting the caster and camber of a front wheel assembly of this type with conventional hand tools is for the most part limited to trial and error and therefore considerable time must be expended to properly perform such adjustments.

It is to be noted that while the tool assembly of the instant invention has been specifically designed for the aforementioned vehicles, it is also well suited to perform the corresponding adjustments on other types of vehicles which utilize similar construction in the front wheel assemblies thereof.

It is the main object of this invention to provide a caster and camber correction tool assembly which may be effectively utilized to accurately adjust the caster and camber of the type of front wheel assemblies hereinbefore set forth.

Still another object of this invention, in accordance with the immediately preceding object, is to provide a tool assembly including means by which the amount of adjustment required may be fairly accurately predetermined and thus effected without resorting to trial and error methods.

Still another object of this invention is to provide a tool assembly including one portion designed specifically for lifting the inner end of a vehicle upper control arm from its engagement with a vehicle frame in order that the knurled or serrated surfaces of the inner journals for the upper control arm and the vehicle frame which are normally disposed in surface-to-surface contacting relation may be disengaged thereby enabling the outer end of the control arm to be more readily adjusted as desired before the inner end of the upper control arm is again securely bolted to the vehicle frame.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary perspective view of the under portion of the lefthand forward corner of a conventional type of motor vehicle showing a portion of the independent wheel suspension thereof and the manner in which one portion of the tool assembly may be positioned and secured between the outer end of the control arm and the frame of the vehicle for adjusting the outer end of the control arm through a horizontal plane as desired;

FIGURE 2 is a fragmentary perspective view of the same portion of the vehicle as shown in FIGURE 1 of the drawings but as seen from above and within the engine compartment of the vehicle and the manner in which the second portion of the tool assembly may be utilized to lift the inner end of the control arm free from supported engagement with the frame thereby enabling the outer end of the upper control arm to be more readily adjustably positioned as desired;

FIGURE 6 is a perspective view of one portion of the tool assembly of the instant invention shown with a portion of the positioning handle thereof being broken away;

FIGURE 7 is a perspective view of the other portion of the tool assembly of the instant invention;

FIGURE 8 is a fragmentary longitudinal vertical sectional view taken substantially upon the plane indicated by the section line 8—8 of FIGURE 3;

FIGURE 9 is an enlarged fragmentary sectional view taken substantially upon a plane indicated by the section line 9—9 of FIGURE 6; and FIGURE 10 is an exploded perspective view of the portion of the tool illustrated in FIGURE 6 of the drawings with parts thereof being removed.

Figure 3:
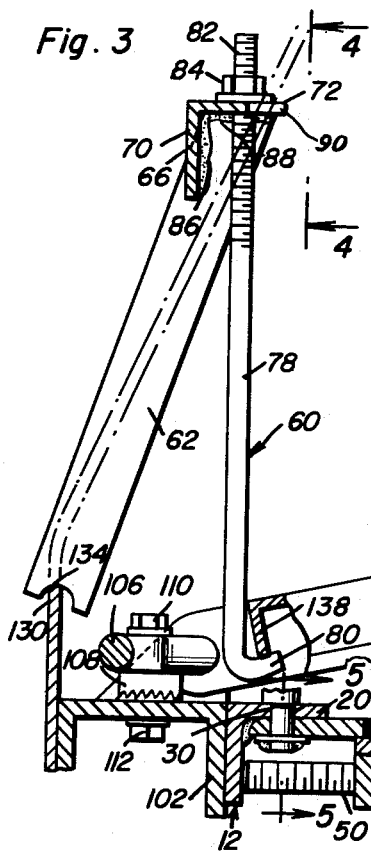
FIGURE 3 is an enlarged fragmentary transverse vertical sectional view taken substantially upon the plane indicated by the section line 3—3 of FIGURE 1.

Referring now more specifically to the drawings the numeral 10 generally designates the first portion of the tool assembly which includes an elongated abutment member generally referred to by the reference numeral 12, an elongated thrust arm 14, and an elongated cross arm 16. The abutment member is generally L-shaped in cross-section and includes an abutment flange 18 and a mounting flange 20. The flanges 18 and 20 are disposed at substantially 90 degrees relative to each other and are joined along adjacent marginal edge portions. In addition, the abutment member 12 includes a laterally directed mounting arm portion 22 which is secured to the undersurface of the approximate mid-portion of the flange 20 in any convenient manner such as by welding 24. The mounting arm portion 22 extends away from the flange 18 and is provided with an elongated longitudinally extending slot 26 at its outer end portion. The portion 10 further includes an elongated handle 28 and one end of the handle 28 includes a laterally directed and diametrically reduced end portion 30 which is pivotally secured through the overlapped portions of the mounting arm portion 22 and the flange 20. The end of the handle 28 remote from the diametrically reduced portion 30 is provided with a cross member 32 and the handle 28 includes a bend 34 which interconnects first and second angulated end portions 36 and 38 of the handle 28.

The elongated thrust arm 14 is provided with an aperture 40 at one end portion and has that same end portion fixedly secured to the mid-portion of the cross-arm 16 in any convenient manner such as by welding 42. The thrust arm 14 is disposed at substantially right angles relative to the cross-arm 16 and is provided with a second aperture 44 at its outer end.

The opposite ends of the cross-arm 16 are provided with threaded bores 46 and 48 and these bores have a pair of threaded bolts 50 and 52 threadedly engaged therein. One pair of ends of the bolts 50 and 52 is adapted to engage the flange 18 and the other pair of ends of the bolts 50 and 52 is provided with diametrically enlarged head portions 54 which may be engaged by a wrench to effect rotation of the bolts 50 and 52.

A pivot fastener 56 is secured through the slot 26 and the aperture 40 and thereby defines a pin and slot connection between the thrust arm 14 and the mounting arm portion 22.

The second portion of the instant invention is generally designated by the reference numeral 60 and includes a pair of depending leg portions 62 and 64 which are interconnected at their upper ends by means of a bight portion 66. The lower ends of the leg portions 62 and 64 are notched as at 68 and the bight portion 66 is L-shaped in cross-section and includes an upstanding flange 70 and a horizontally disposed flange 72.

The opposite ends of the horizontally disposed flange 72 are provided with apertures 74 and a pair of J-shaped hooks 76 is provided and includes shank portions 78 which are slidably received through the apertures 74 and hooked lower terminal end portions 80. The upper ends of the shanks 78 are externally threaded as at 82 and have threaded abutment members in the form of nuts 84 threadedly engaged therewith.

As can best be seen from FIGURE 3 of the drawings the leg portions 62 and 64 are secured to the flanges 70 and 72 in any convenient manner such as by welding 86 and 88, respectively. Further, the longitudinal edge of the flange 72 remote from the flange 70 is concavely curved as at 90 for a purpose to be hereinafter more fully set forth. Finally, the first arm 14 includes an angulated portion 92 which laterally offsets the free end portion 94 from the base end portion 96 of the thrust arm 14.

Figure 4:
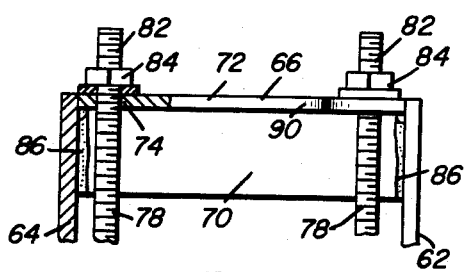
FIGURE 4 is a fragmentary vertical longitudinal sectional view taken substantially upon the plane indicated by the section line 4—4 of FIGURE 3.
Figure 5:
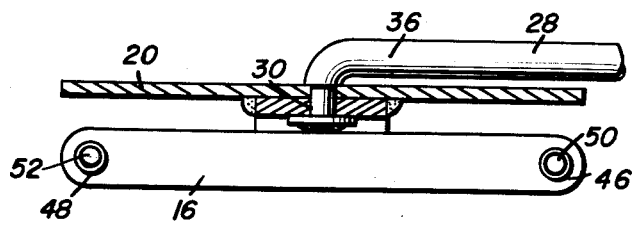
FIGURE 5 is a fragmentary longitudinal vertical sectional view taken substantially upon the plane indicated by the section line 5—5 of FIGURE 3.

With attention now directed more specifically to FIGURES 1 and 4 of the drawings there will be seen a portion of a conventional form of motor vehicle generally referred to by the reference numeral 100 which includes a longitudinal frame member 102 and an upper control arm 104. The upper control arm is pivotally secured at its inner end to a pivot shaft 106 supported by mounting blocks or journals 108 that are bolted to the longitudinal frame member 102 in any convenient manner such as by bolts 110. The confronting surfaces of the mounting blocks 108 and the longitudinal frame member 102 are knurled or serrated as at 112 to prevent shifting of the mounting blocks 108 relative to the longitudinal frame member 102. The upper control arm 104 includes a spring seat 114 to which the bottom of a coil spring 116 is secured. The upper end of the coil spring 116 is seated in a downwardly opening socket carried by an upper portion of the vehicle frame or body. The outer end of the upper control arm 104 supports a ball socket assembly 118 and the upper end of a spindle assembly 120 includes a ball unit (not shown) which is swivelly received in the assembly 118. The ball unit is secured through the laterally directed upper end portion 122 of the spindle assembly 120 by means of a threaded shank 124 carried thereby and a threaded fastener 126 which is threadedly engaged with the shank 114.

From FIGURE 2 of the drawings it may be seen that the vehicle 100 includes integral body and frame portions 130 having a pair of openings 132 and 134 formed therein which provide access to the bolts 110 from the interior of the engine compartment defined by the combined frame and body portions 130.

In order to adjust the camber and caster of the wheel assembly of which the spindle 120 comprises a part, the bolts 110 must be loosened and the mounting blocks 108 must be raised from engagement with the longitudinal frame rail or section 102. The bolts 110 are passed and secured through enlarged openings (not shown) formed in the frame member 102 and therefore the position of the mounting blocks 108 relative to the frame member 102 may be adjusted in the plane of the upper surface of the frame member 102 after the bolts 110 have been loosened. This adjustment of the position of the mounting blocks 108 relative to the frame member 102 is made to adjust the caster and camber of the wheel assembly of which the spindle 120 comprises a part.

In operation, the second portion 60 is first positioned as viewed in FIGURE 2 of the drawings with the downwardly opening recesses cradling the inner peripheral edge portions of the openings 132 and 134. The bight portion 66 is then leaned outwardly of the vehicle 100 and against the combination frame and body portion 130. The J-shaped hooks 76 are then slipped under the downturned lip 138 formed at the inner end of the arm 104. Thereafter, the bolts 110 may be loosened and subsequently the nuts 84 may be turned down on the shanks 78 in order to raise the inner end of the upper control arm 104 relative to the frame member 102 and thereby disengage the serrations 112 carried by the mounting blocks 108 and the frame member 102. Thereafter, the first portion 10 is supported by the handle 28 and positioned as viewed in FIGURE 1 of the drawings after the nut 126 has been removed in order that the shank 124 may be passed through the aperture 44. Thereafter, the nut 126 is replaced on the shank 124 as shown in FIGURES 1 and 4 of the drawings and then the bolts 50 and 52 are screwed inwardly so that their inner ends will engage the flange 18. With the portions 10 and 60 thus positioned, the bolts 50 and 52 may then be further rotated so as to adjust the outer end of the control arm 104 through a horizontal plane as desired.

In some instances the tension of the spring 116 will have a tendency to kick the inner end of the control arm 104 inwardly as soon as the bolts 110 are loosened and the nuts 84 are screwed down on the shank portions 78. In this instance it is advisable to first install the first portion 10 in order that the outer end of the control arm 104 may be at least retained in the position from which it is to be adjusted thereby enabling accurate adjustment to be made by turning in or backing off either or both of the bolts 50 and 52 a predetermined amount. If the caster or camber of the wheel assembly is off a given number of degrees and this number of degrees has been previously determined, practice with the first portion 10 will soon illustrate that an accurate adjustment by turning the bolts 50 and 52 a certain number of turns to correct a given condition may be made.

The handle 28 may be manipulated to effect inward movement of the control arm 104 relative to the frame member 102 by backing off the bolts 50 and 52 sufficiently to permit the movement of the elongated abutment member 12 in spaced apart rather than continuous relationship to the longitudinal frame member 102. The pivot fastener 56 is then secured to permit movement of the control arm 104 by manipulation of the handle 28 by virtue of the fact that the portion 10 of the tool assembly is secured to the threaded shank 124 of the spindle assembly 120.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A tool for lifting the inner end of a vehicle upper control arm, said tool defining an upstanding member including first abutment means at its lower end adapted to engage the inner peripheral portions of the inner control arm bolt access openings formed in a vehicle body and second abutment means at its upper end adapted to lean laterally of the medial plane of said tool and outwardly toward one side of the vehicle to which said control arm is secured and against a portion of said vehicle disposed above said access openings, said tool further including depending hook means adapted at its lower end to hook under an inner end portion of said control arm and means at its upper end securing said hook means to said member for vertical adjustment relative to the latter whereby the inner end of said control arm may be raised from engagement with the portion of the frame of said vehicle over which it lies after the holddown bolts for the control arm are loosened, the medial plane of said hook means forming an acute angle with the medial plane of said member.

2. The combination of claim 1 wherein said upstanding member is generally U-shaped in shape and defines a pair of depending leg portions interconnected at their upper ends by means of a bight portion, said first abutment means being carried by the lower ends of said legs and said second abutment means being defined by said bight portion.

3. The combination of claim 2 wherein said bight portion is elongated and extends longitudinally between said leg portions, one side of said bight portion being contoured so as to be adapted to engage said portion of said vehicle in surface-to-surface contacting relation therewith.

4. The combination of claim 1 wherein said upstanding member is generally U-shaped in shape and defines a pair of depending leg portions interconnected at their upper ends by means of a bight portion, said first abutment means being carried by the lower ends of said legs and said second abutment means being defined by said bight portion, the lower ends of said leg portions defining downwardly opening recesses comprising said first abutment means.

5. The combination of claim 1 wherein said upstanding member is generally U-shaped in shape and defines a pair of depending leg portions interconnected at their upper ends by means of a bight portion, said first abutment means being carried by the lower ends of said legs and said second abutment means being defined by said bight portion, said bight portion being elongated and extending longitudinally between said leg portions and having upstanding apertures formed in its opposite end portions, said hook means comprising a pair of generally J-shaped members whose upper ends are slidably received through said apertures and have abutments secured to the portions thereof disposed above said bight portion for abutting engagement with said bight portion and vertical adjustment relative to said J-shaped members.

6. A tool for adjusting the camber and caster of a vehicle wheel including upper and lower control arms, said tool comprising an elongated abutment member having one longitudinal marginal edge portion adapted to extend along and abut the outside surface of a longitudinal frame member disposed between the inner and outer ends of one of said control arms secured to said frame member, an elongated thrust arm, means pivotally securing said thrust arm at one end to said abutment member intermediate its opposite ends for rotation about an axis extending transversely of said arm and abutment member and with the other end of said arm projecting outwardly of the other longitudinal marginal edge portion of said elongated abutment member, a cross arm member carried by said arm intermediate its opposite ends and generally paralleling said abutment member, means carried by the outer end of said arm member adapted to be releasably connected to the outer end of said one control arm, and force means connected to one of said members on opposite sides of said arm and engageable with the corresponding portions of the other of said members for selectively urging corresponding pairs of the opposite end portions of said members away from each other.

7. The combination of claim 6 wherein said means pivotally securing said thrust arm to said abutment member includes means for graduallly shifting the axis of rotation of said arm laterally of said abutment member.

8. The combination of claim 7 wherein said means pivotally securing said thrust arm to said abutment member includes a pin and slot connection.

9. The combination of claim 6 wherein said force means comprises a pair of threaded bolts threadedly engaged with the opposite end portions of said cross arm and engageable at one pair of ends with said abutment member.

10. An assembly for adjusting the caster and camber of a vehicle wheel assembly including upper and lower control arms, said assembly including first means adapted to be supported from a vehicle frame and engaged with the inner end of one of said arms and including means for lifting said inner end from engagement with the portion of the vehicle frame to which it is normally secured, second means adapted for connection to the outer end of said arm and a portion of said vehicle frame disposed inwardly of the outer end of said arm said second means including means for shifting said outer end of said arm in all directions relative to said vehicle frame through a generally horizontally disposed plane.

11. A tool assembly for lifting the inner end of a vehicle upper control arm and for adjusting the camber and caster of a vehicle wheel assembly of which the upper control arm comprises a part by adjustably shifting the outer end of the control arm in a plane generally paralleling the medial plane of the control arm, said assembly comprising an upstanding member including first abutment means at its lower end adapted to engage the inner peripheral portions of the inner control arm bolt access openings formed in a vehicle body and second abutment means at its upper end adapted to lean laterally of the medial plane of said tool and outwardly toward one side of the vehicle to which said control arm is secured and against a portion of said vehicle disposed above said access openings, said tool further including depending hook means adapted at its lower end to hook under an inner end portion of said control arm and means at its upper end securing said hook means to said member for vertical adjustment relative to the latter whereby the inner end of said control arm may be raised from engagement with the portion of the frame of said vehicle over which it lies after the holddown bolts for the control arm are loosened, the medial plane of said hook means forming an acute angle with the medial plane of said member, said assembly further including an elongated abutment member having one longitudinal marginal edge portion adapted to extend along and abut the outside surface of a longitudinal frame member extending transversely of and disposed intermediate the opposite ends of said arm, an elongated thrust arm, means pivotally securing said thrust arm at one end to said abutment member intermediate its opposite ends for rotation about an axis extending transversely of said arm and abutment member and with the other end of said arm projecting outwardly of the other longitudinal marginal edge portion of said elongated abutment member, a cross arm member carried by said arm intermediate its opposite ends and generally paralleling said abutment member, means carried by the outer end of said arm member adapted to be releasably connected to the outer end of said one control arm, and force means connected to one of said members on opposite sides of said arm and engageable with the corresponding portions of the other of said members for selectively urging corresponding pairs of the opposite end portions of said members away from each other.

12. The combination of claim 10 wherein said first means comprises means for lifting said arm, means mounting said means on said first means for movement relative to said first means, said means for lifting said arm being adapted to be engaged with the undersurface of the inner end of said control arm, said means mounting said lifting means on said first means including means for shifting said lifting means relative to said first means in a manner to lift the inner end of said control arm from engagement with said frame.

13. A tool for adjusting the camber and caster of a vehicle wheel assembly by shifting the outer end of the upper control arm comprising a portion of the wheel assembly through a plane generally paralleling the medial plane of the upper control arm, said tool comprising abutment means adapted for surface-to-surface abutting engagement with the outer surface of a longitudinal frame member disposed between the inner and outer ends of said control arm, and force means supported from said abutment means for limited movement in all directions in a single plane relative to said abutment means, said force means including means adapted for removable engagement with the outer end of said upper control arm, and actuating means connected between said force means and said abutment means for positively shifting said force means through said plane relative to said abutment means.

References Cited by the Examiner
UNITED STATES PATENTS
2,098,134  11/1937  Cook et al. _____ 29—265

WILLIAM FELDMAN, *Primary Examiner.*

MILTON S. MEHR, *Examiner.*